United States Patent [19]

Wood

[11] 4,358,151
[45] Nov. 9, 1982

[54] HINGED REAR WINDOW

[76] Inventor: Herman C. Wood, 30 Porpoise Pl., New Port Richey, Fla. 33552

[21] Appl. No.: 89,616

[22] Filed: Oct. 29, 1979

Related U.S. Application Data

[63] Continuation-in-part of Ser. No. 26,097, Apr. 2, 1979, abandoned.

[51] Int. Cl.³ .............................................. B60J 1/18
[52] U.S. Cl. .................................... 296/146; 296/216; 29/401.1; 49/402; 16/364
[58] Field of Search ............... 296/218, 223, 224, 146, 296/221, 216, 37.16, 166, 99 R, 201, 37.08, 53, 55; 49/465, 397, 261, 171, 506, 402, 485; 29/401.1; 160/180; 16/128.1, 129, 130, 180, 190, 150, 178

[56] References Cited

U.S. PATENT DOCUMENTS

| | | | |
|---|---|---|---|
| 2,551,239 | 5/1951 | Bond | 296/223 |
| 2,745,149 | 5/1956 | Etling | 49/506 |
| 3,494,659 | 2/1970 | Trenkler | 296/218 |
| 3,598,442 | 8/1971 | Miller | 16/190 |
| 3,770,312 | 11/1973 | Shadburn | 49/402 |
| 3,947,006 | 3/1976 | Bauer | 296/56 |
| 4,095,640 | 6/1978 | Beckerer, Jr. | 49/485 X |
| 4,115,955 | 9/1978 | Aldrich | 296/218 X |
| 4,154,474 | 5/1979 | Hough et al. | 296/224 X |

FOREIGN PATENT DOCUMENTS 1581592 12/1980 United Kingdom ............... 296/216

Primary Examiner—Robert R. Song
Attorney, Agent, or Firm—Frijouf, Rust & Pyle

[57] ABSTRACT

An apparatus is disclosed for modifying a permanently mounted rear window of a vehicle to convert a conventional vehicle into a hatch-back vehicle. The apparatus comprises a first frame securable to the original window opening of the vehicle. A second frame receives the original window of the vehicle. A hinge pivotably mounts the second frame relative to the first frame enabling the original window to be pivoted between a closed and an open position. The hinge may be a telescoping type which telescopes upon pivoting the original window into an open position. Such telescoping creates a space between the edge of a window and the body of the vehicle. Air flow coming over the top of the vehicle may then be directed through said space and into an area beneath the open window. A latch is provided for locking the second frame to the first frame in the closed position.

8 Claims, 11 Drawing Figures

U.S. Patent  Nov. 9, 1982  Sheet 1 of 3  4,358,151
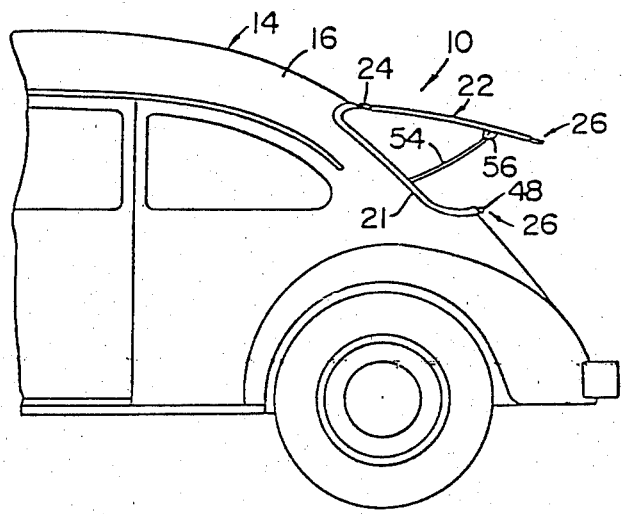
FIG. 1
FIG. 2
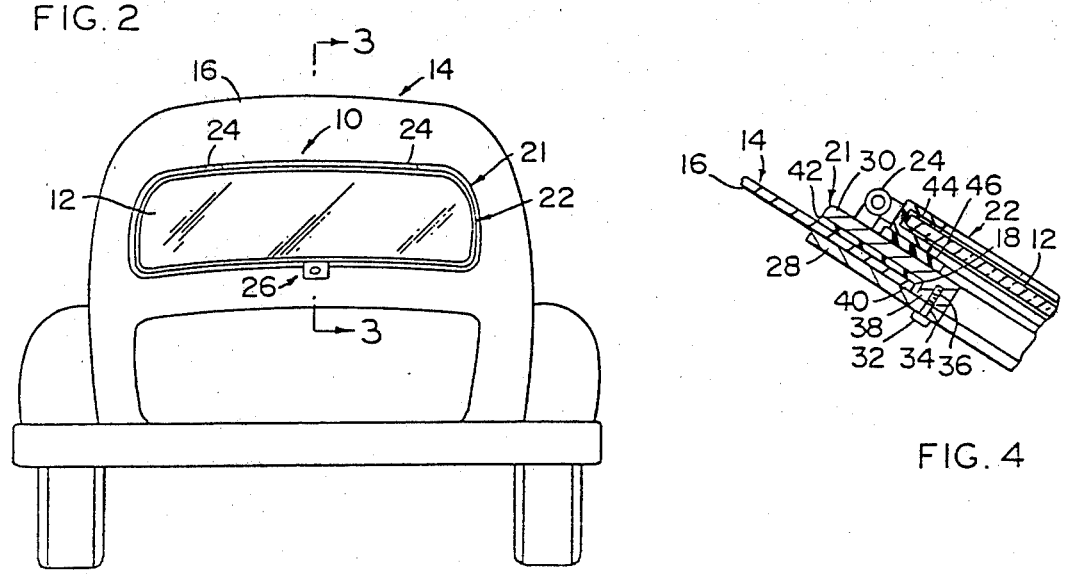
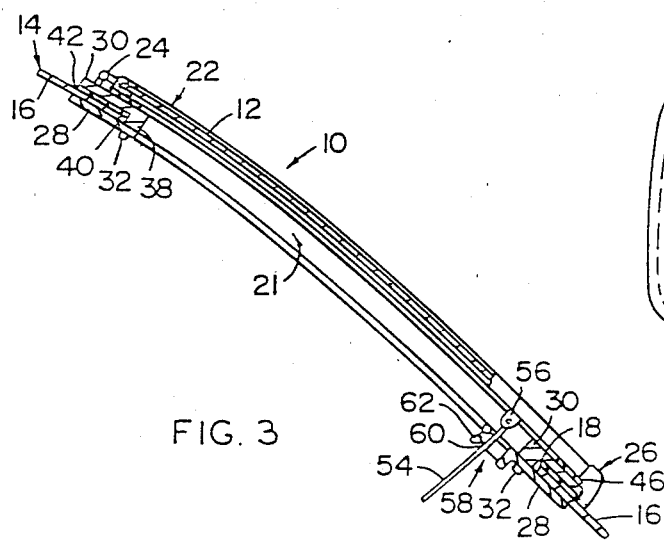
FIG. 3
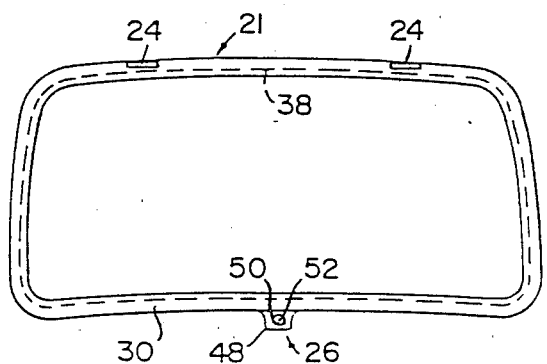
FIG. 4
FIG. 5

HINGED REAR WINDOW

CROSS-REFERENCE TO RELATED APPLICATONS

This application is a continuation-in-part of my prior application Ser. No. 026,097, filed Apr. 2, 1979 now abandoned.

The foregoing abstract is merely a resume of one general application, is not a complete discussion of all principles of operation or applications and is not to be construed as a limitation on the scope of the claimed subject matter.

BACKGROUND OF THE INVENTION

This invention relates to motor vehicles and more particularly to an apparatus for modifying a permanently mounted rear window of a vehicle into a window which may be opened.

The rising cost of fossil fuel and gasoline has caused a substantial change in the type and size of automobiles purchased by the American consumer. Automobiles, both domestic and foreign, have been substantially reduced in size and weight to produce a more economical vehicle in terms of gas consumption. In many cases, the reduction of internal space in these smaller automobiles has provided an additional burden to the American consumer who has become accustomed to large automobiles. In many cases, the simple task of hauling lumber, boards, and other large objects has become an impossible task for the reduced size automobiles.

To overcome this problem in the small vehicles, many manufacturers have produced what is commonly referred to as a "hatch-back" automobile. In this type of automobile, a large rear window is pivotably mounted along the top window edge to act as a rear window and a trunk lid. Accordingly, the spaciousness produced by the large window area and the utility of having an openable rear window substantially increases the usable space within a relatively small automobile. The window may be held in the open position by a support or the like for ventilation or for transporting long objects such as lumber, or other similar objects.

Unfortunately, the hatch-back is a relatively new innovation and many smaller automobiles have been produced over the years without such a desirable feature. In other instances, many fine automobiles have been constructed without a hatch-back rear window. In many cases, it would be desirable to modify a permanently mounted rear window into a hatch-back. Unfortunately, the costs of a new frame, new glass and the like makes this a costly transition. Many so called "kits" are available for installing skylights and the like in automobiles, vans and similar vehicles which incorporate a frame and a window incorporated therein. In general, these windows are made of plastic and are unacceptable for a rear window of an automobile. The movable windows in existing kits are unsuitable for replacing a rear window in a conventional automobile.

In most hatch-back rear windows, when the window is open and the vehicle is moving, a void or dead air space is created beneath the window. This is due to the fact that the air flowing over the vehicle also flows over the open window. When the air flows past the window, turbulence is created at the tail or rear end of the vehicle. Such turbulence is most undesirable since it agitates or kicks up road dirt which then enters the open window and contaminates the inside of the vehicle. Another disadvantage is the fact that fumes emitted from the vehicles exhaust rise into the dead air space and enter the vehicle through the open window. Because of these disadvantages, most vehicle manufacturers warn the consumer not to drive the vehicle with the rear window open.

Therefore it is an object of this invention to provide an apparatus which overcomes the aforementioned inadequacies of the above mentioned devices and provides an improvement which is a significant contribution to the advancement of the window replacement art.

Another object of this invention is to provide an apparatus for modifying a permanently mounted window of a vehicle into a movable window wherein the original window of the vehicle can be used as the pivotably mounted window.

Another object of this invention is to provide an apparatus for modifying a permanently mounted window of a vehicle into a movable window incorporating a first frame securable to the original window opening and a second frame for receiving the original window of the vehicle with a hinge disposed therebetween enabling the original window to be pivoted between a closed and an open position.

Another object of this invention is to provide a means to eliminate the dead air space beneath the open window by directing the air flowing over the vehicle into said dead air space.

Another object of this invention is to provide a means to eliminate the turbulence created at the tail end of the open window and thus precluding road dirt from entering the vehicle.

Another object of this invention is to provide a means to preclude exhaust fumes from rising into the dead air space beneath the open window and entering the vehicle.

Another object of this invention is to provide an apparatus for modifying a permanently mounted window of a vehicle into a movable window wherein the modification can be accomplished with the use of simple tools by the consumer.

Another object of this invention is to provide an apparatus for modifying a permanently mounted window of a vehicle into a movable window which does not require any cutting of the vehicle body.

Another object of this invention is to provide an apparatus for modifying a permanently mounted window of a vehicle into a movable window wherein the first frame is secured to the original window opening by conventional fasteners engaging inner and outer surfaces of the vehicle body.

Another object of this invention is to provide an apparatus for modifying a permanently mounted window of a vehicle into a movable window wherein the original window may be readily inserted into the second frame for pivotable movement relative to the vehicle body.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings and explained in the detailed discussion. For the purpose of summarizing the invention, the invention may be incorporated into an apparatus for modifying a permanently mounted window of a vehicle into a movable window. The apparatus is suitable for converting a conventional rear window into what is commonly referred to as a "hatch-back". The apparatus includes a first frame which is securable to the vehicle body adjacent the original window opening of the vehicle. A second frame receives the original window therein. A hinge pivotably mounts the second frame relative to the first frame enabling the original window to be pivoted between a closed and an open position relative to the vehicle body. A latch is provided for locking the second frames in a closed position.

In a more specific embodiment of the invention, the first frame comprises a substantially U-shaped portion for grasping the inner and outer surfaces of the vehicle body adjacent the window aperture. The first frame includes an inner and outer frame element disposed on the inner and outer sides of the vehicle body adjacent the window aperture. Fastening means such as threaded fasteners secure the inner frame element to the outer frame element for grasping the vehicle body therebetween. One of the inner and outer frame elements may include a shoulder for engaging the terminating edge of the vehicle window aperture to position the first frame and the surface of the vehicle body adjacent the window aperture for sealing the first frame thereto. A gasket sealer is preferably disposed between the internal side of the U-shaped first frame and the surface of the vehicle body adjacent the window aperture for sealing the first frame thereto. A gasket material is also disposed between the first frame and the second frame forming a weather-tight seal therebetween.

A support is preferably used to maintain the second frame in the open position. The support may comprise a simple mechanical linkage creating a triangular configuration between the first and second frame, the hinge and the support. The second frame comprises a substantially U-shaped cross-section for grasping the inner and outer surfaces of the original vehicle window. A gasket sealer is disposed between the internal sides of the U-shaped second frame and the inner and outer surfaces of the vehicle window for sealing the vehicle window to the second frame. The second frame is temporarily distorted during the insertion of the rear window therein. After the rear window is inserted within the second frame, the second frame returns to the undisturbed condition. The latch interlocking the first and second frame preferably includes a keyed lock for aiding the security of the device.

An important aspect of the invention is the use of the original vehicle window in a new frame to modify a permanently mounted rear window of a vehicle into a hatch-back configuration. The use of the original window makes the apparatus a suitable alternative to many consumers who have purchased small vehicles without the desirable feature of a hatch-back rear window.

In another more specific embodiment of the invention, the hinge is specially designed to create a space between the top of the window and the vehicle body when the window is in an open position. Air flowing over the vehicle may then pass through such space and flow into the dead air space beneath the open window. This modified airflow eliminates the turbulence normally created at the tail end of the window. Road dirt is thus prevented from being agitated or kicked up and entering the vehicle. Furthermore, as the airflow flows into the dead air space, it actually blows the rising exhaust fumes coming from the vehicle out from beneath the open window. It is therefore evident that with the use of this hinge, the vehicle can be safely operated with the window open without fear of becoming asphyxiated or contaminating the interior of vehicle with road dirt.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawing in which;

FIG. 1 is a side elevational view of the invention installed on a vehicle showing the window in an open position;

FIG. 2 is a rear elevational view of the vehicle showing the window in the closed position;

FIG. 3 is a side sectional view along line 3—3 in FIG. 2;

FIG. 4 is an enlarged partial view of FIG. 3;

FIG. 5 is an enlarged partial view of FIG. 2;

Similar reference characters refer to similar parts throughout the several views of the drawings.

DETAILED DISCUSSION OF THE PREFERRED EMBODIMENT

Figure 6:
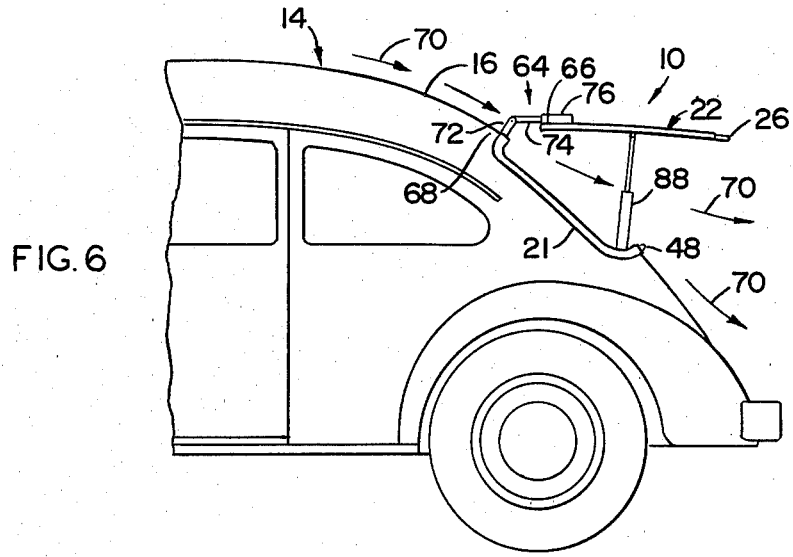
FIG. 6 is another side elevational view of the invention showing the window in an open position with the telescopic hinge in an extended position.

FIGS. 1–11 illustrate various views of an apparatus 10 for modifying a permanently mounted window 12 of a vehicle 14 shown as an automobile. The embodiment shown herein illustrates the modification of a permanently mounted rear window of an automobile but it is understood that the invention may be applicable to other permanently mounted windows in automobiles, motorized homes, recreational vehicles or the like.

An important aspect of the apparatus 10 is the use of the original window pane 12 from the vehicle 14 in the apparatus 10. The apparatus 10 comprises a first frame 21 securable relative to the original opening 18 of the vehicle 14 with a second frame 22 receiving the original window pane 12 of the vehicle 14. A hinge 24 pivotably mounts the second frame 22 relative to the first frame 21 enabling the original window pane 12 to be pivoted between a closed position shown in FIG. 2 and an open position shown in FIG. 1. A latch 26 locks the second frame to the first frame in the closed position.

Figure 8:
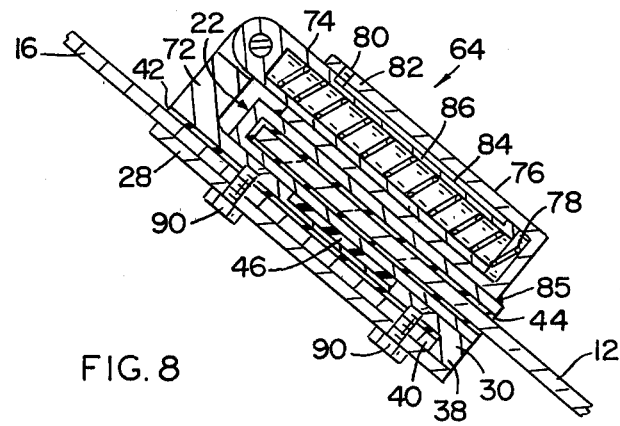
FIG. 8 is an enlarged view of the telescopic hinge when the window is in a closed position.
Figure 11:
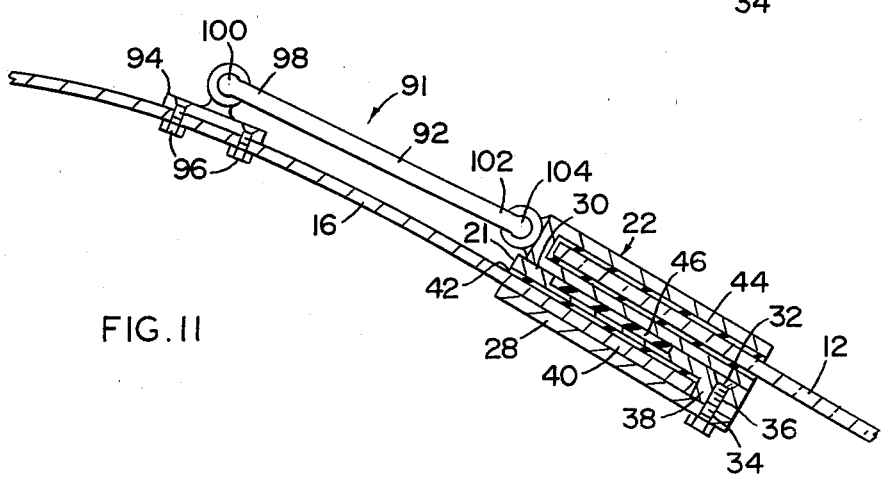
FIG. 11 is an enlarged view of the pivotal member of the hinge when the window is in a closed position.

More specifically, in FIGS. 4, 8 and 11 the first frame 21 comprises an inner frame 28 and an outer frame 30 securable relative to one another by threaded fasteners 32 shown as a screw extending through apertures 34 in the inner frame 28 to threadably engage apertures 36 in the outer frame 30. The outer frame 30 preferably has a shoulder 38 for engaging the terminal end 40 of the original opening 18 of the vehicle body 16. The shoulder 38 extends about the entire periphery of the first frame 21 as shown more clearly in FIG. 5 enabling the first frame 21 to be positioned relative to the original opening 18 of the vehicle 14. A gasket 42 is disposed between the outer frame 30 and the vehicle body 16 to provide a weather tight seal. The screw 32 causes the inner and outer frames 28 and 30 to grasp opposed sides of the vehicle body 16 and to compress the gasket material 42. The shoulder 38 which may be disposed on the outer frame 30 enables the first frame 21 to be easily positioned relative to the original opening 18 of the vehicle 14.

The second frame 22 has a substantially U-shaped cross-sectional frame which is pivotably mounted relative to the first frame 21 by hinges 24. A gasket material 44 extends about the inside of the U-shaped second frame 22 to resiliently grasp opposed sides of the original window pane 12. The second frame 22 may be a one piece fabricated frame which is distortable for inserting the window pane 12 therein. A sealing gasket 46 is disposed on the outer surface of the first frame 21 producing a weather tight seal between the first and second frames 21 and 22. It should be understood that sealing gasket 46 may be disposed on the inside of the second frame 22. The latch 26 may be a conventional design comprising a mechanical latch 48 having a lock 50 with a key hole 52. The mechanical latch 48 is securable to the first frame 21. A support bar 54 is pivotably mounted to the second frame 22 by a pivot 56 and mounted to the first frame 21 by a sliding, fastening device 58. In the embodiment shown in FIG. 3, the slide fastening device 58 is disposed on the internal frame 30 with the support beam 54 slideably received in an aperture 60 of the sliding fastener 58. A thumb screw 62 secures the position of the support beam 54 relative to the sliding fastener 58 enabling the second frame 22 to be positioned at various angles between a closed and an open position.

The foregoing has described a novel apparatus for modifying a permanently mounted window of a vehicle into a window which may be opened. An important aspect of this invention is the inclusion of the original window pane into the apparatus to provide the desired results. The use of the original window pane in a distortable second frame makes the apparatus an economically, feasible innovation. In addition, the incorporation of the shoulder 38 of the first frame makes the device readily installable without any cutting of the vehicle body. The apparatus enables a conventional permanently mounted window of a vehicle to be converted into a hatch-back in an afternoon project for the home mechanic. In addition, the component parts of the kit can be produced at a very reasonable price.

As described earlier, hinge 24 pivotably mounts the second frame 22 relative to the first frame 21 enabling the original window pane 12 to be pivoted between a closed position shown in FIG. 2 and an open position shown in FIG. 1. Hinge 24 may be an extendible hinge such as a telescopic hinge 64 or as a hinge 91 having a pivotal member 92. Hinges 64 and 91 would operate in a similar manner but provide the discussed additional feature of extending into the positions shown in FIGS. 6 and 9 when the window 12 is in an open position. When the window is open, hinges 64 and 91 create a space between the top 66 of window 12 and the edge 68 of the vehicle body 16. In this manner, air flows over the top of the vehicle 14 through such space and into the dead air space located directly beneath the open window 12 as shown by arrows 70. This airflow eliminates many of the disadvantages associated with the existing hatch-back type windows. In particular, this airflow eliminates the turbulence created at the trailing end of the window as the vehicle is moving. Thus, road dirt is precluded from being kicked up and entering the inside of the vehicle 14. Furthermore, the airflow blows any exhaust fumes from the vehicle 14 out from beneath the window 12. Hence, vehicle 14 can be safely operated with the window in an open position.

Figure 7:
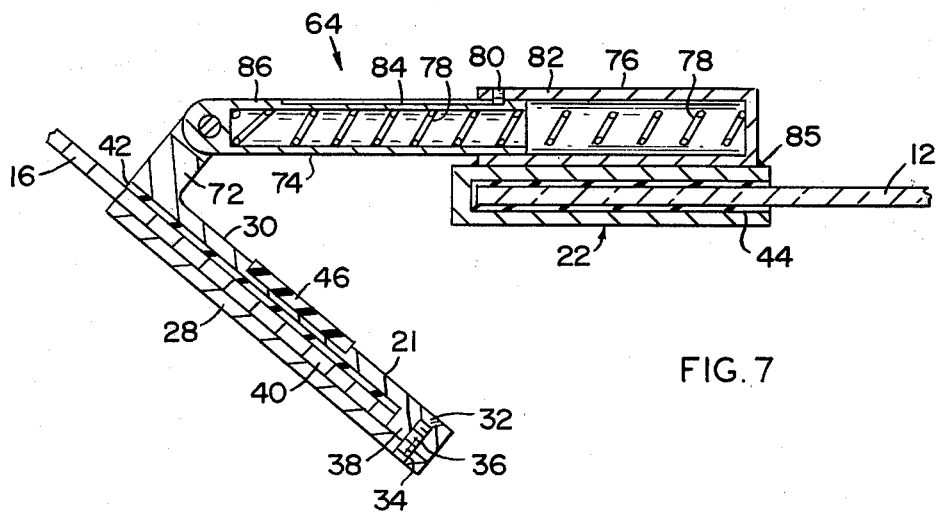
FIG. 7 is an enlarged view of the telescopic hinge of FIG. 6.

As best shown in FIGS. 7 and 8, telescopic hinge 64 is connected by a hinge base 72 to the outer frame 30 of the first frame 21. Telescopic hinge 64 comprises an inner tube 74 slideably engaged in an outer tube 76. Both tubes 74 and 76 are preferably substantially rectangular in their cross-sections. A spring 78 is disposed within the tubes 74 and 76 to force the tubes 74 and 76 apart. A set screw 80 or the like is threaded into the wall 82 of the outer tube 76 and extends into a set screw track 84 disposed along the wall 86 of the inner tube 74. Set screw 80 is threaded only to a depth into set screw track 84 to allow the tubes 74 and 76 to slideably engage each other. However, set screw 80 defines the limit of travel in which tubes 74 and 76 can be pushed apart by spring 78. The wall 82 of outer tube 76 is rigidly attached to the second frame 22 by means such as welding 85 as shown in FIG. 7. It is noted that the attaching means may also comprise threaded fasteners (not shown) which would rigidly attach wall 82 to second frame 22. A pneumatic arm 88 or the like is pivotably attached between second frame 22 and first frame 21 to keep window 12 in an open position.

When window 12 is moved to the closed position, pneumatic arm 88 forces outer tube 76 to slide over inner tube 74. Thus, immediately before window 12 is tightly closed, telescopic hinge 64 will be in a contracted position as shown in FIG. 8. When window 12 is in the closed position, second frame 22 is firmly pressed against gasket material 46 as shown in FIG. 8. Thus, a tight seal is formed between the second frame 22 and first frame 21.

Figure 9:
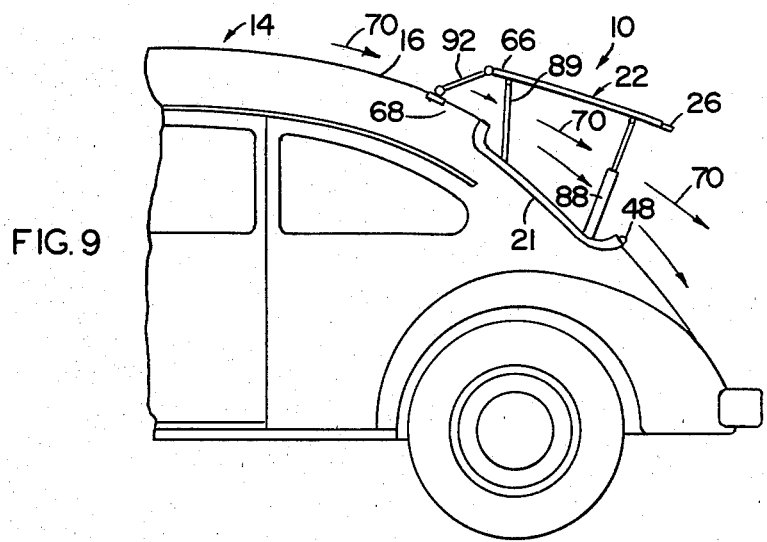
FIG. 9 is another side elevational view of the invention showing pivotal member of the hinge with the window in an open position.
Figure 10:
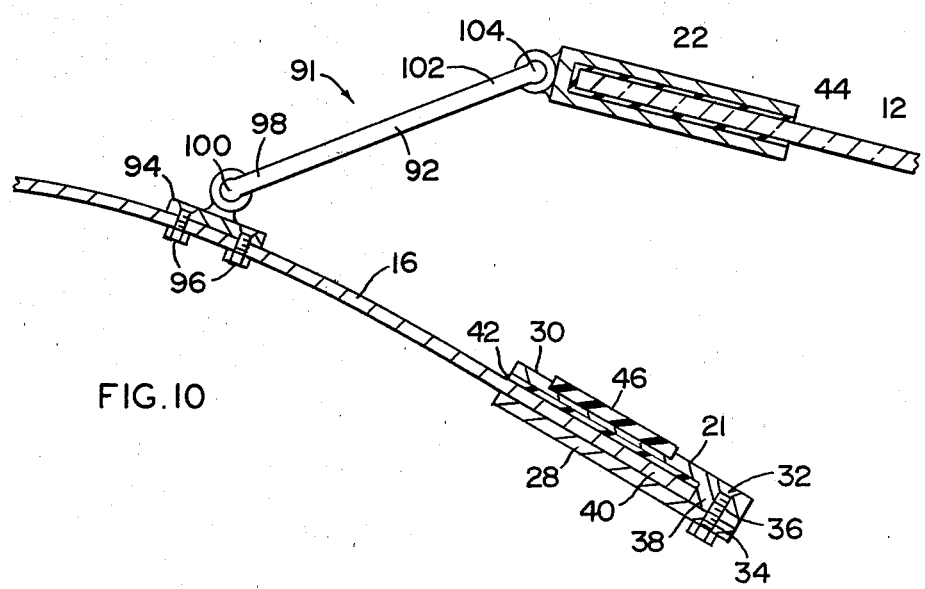
FIG. 10 is an enlarged view of the pivotal member of the hinge of FIG. 9.

As best shown in FIGS. 9, 10 and 11, another means to create a space between the top 66 of window 12 and the edge 68 of vehicle body 16 is through the use of hinge 91 having a pivotable member 92. The base 94 of hinge 91 is secured to the vehicle body 14 immediately above the first frame 21. Base 94 is rigidly attached to the vehicle body 14 by threaded fasteners 96 such as bolts or screws. The first end 98 of pivotable member 92 is pivotably connected to base 94 at a first pivot point 100. Similarly, the second end 102 of the pivotable member 92 is pivotably connected to the end of the second frame 22 at a second pivot point 104.

Upon raising window 12 into an open position as shown in FIG. 9, pivotable member 92 pivots at a first pivot point 100 and at a second pivot point 104. This pivoting creates a space between the top 66 of window 12 and the edge 68 of the vehicle body to allow air to flow through the space beneath the window 12 as shown by arrows 70. In some applications, an optional pneumatic arm 88 may be provided to keep the window 12 in an open position. A support bar 89, pneumatic arm or the like may be utilized to prevent the pivotable member 92 from pivoting downward and thus eliminating such space for the airflow to flow through.

It may sometimes be desirous to more rigidly attach first frame 21 to the terminal end 40. This can be accomplished by means of threaded fasteners 90 extending through inner frame 28, terminal end 40 and outer frame 30. More particularly, threaded fasteners 90 may be flat head bolts with nuts attached thereto, or may even be rivets. In such cases, it will be necessary to drill holes through the terminal end 40 of the vehicle body 16. Nevertheless, such drilling does not depart from the spirit and scope of this application in that it is a fairly simple operation which the typical consumer may easily perform.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:

What is claimed is:

1. In a rear window construction for an automotive vehicle, wherein a body portion having an opening with a first frame and weather seal encompassing the perimeter of the opening, and a window with a second frame and weather seal encompassing the perimeter of the window, together seal off the body opening by said first and second frame and the weather seal being complimentary and capable of fitting together to form a weather tight closure for said body opening;

the provision of a novel hinge construction for positioning the window when open in a stand-off relationship to the body for establishing a clear slip stream air movement through the hinge area and under the window, comprising;

at least one hinge interconnecting the tops of the first and second frames, the hinge construction having means to extend a part thereof for separating the frames in the hinge area when the frames are separated to open the window; and said hinge means comprising a telescopic hinge for providing a telescopic relationship between said first and second frames.

2. The apparatus as set forth in claim 1, wherein said telescopic hinge comprises;

an inner tube whose end is pivotably attached to the base of one of said first and second frames;

an outer tube slideably engaged over said inner tube;

said outer tube being rigidly attached to the other of said first and second frames; and a spring disposed between said inner tube and said outer tube for urging said inner and outer tubes in opposed directions.

3. The apparatus as set forth in claim 2, wherein said inner tube includes a set screw slot disposed within a wall of said inner tube;

said outer tube includes a set screw disposed through a wall of said outer tube for engagement with said set screw slot enabling said outer tube to slide over said inner tube with said set screw limiting the movement between said inner and outer tubes.

4. The apparatus as set forth in claim 1, including a pneumatic arm for maintaining said second frame in an open position and for aiding in the contraction of said telescopic hinge when said window is moved to the closed position.

5. An apparatus for modifying the downwardly sloping rear panel window fixed in a body opening of an automotive vehicle, comprising in combination:

a first trim frame for encompassing the perimeter edge of the body opening of the vehicle after removal of the original window pane;

said first trim frame including an inner and an outer frame portion for positioning on the inner and outer surfaces of the vehicle body perimeter of the window opening;

a weather seal gasket;

fastening means for securing said inner frame portion to said outer frame portion with the vehicle body and gasket therebetween;

a second frame for receiving the original window pane of the vehicle said second frame encasing the perimeter surfaces of the original vehicle window pane;

hinge means including a rod pivotably mounting only the top of said second frame relative to the top of said first frame for enabling said original window pane disposed in said second frame to be pivoted between a closed and an open position, the open position being more nearly horizontal than the former downwardly sloping condition;

whereby a space is created between the top of said first frame and the top of said second frame when said window is in an open position for establishing a clear slip stream air movement through the hinge area and under the window;

latch means for locking said second frame in the closed position; and a pneumatic arm for maintaining said second frame in an open position, and a support bar for keeping said hinge means in an extended position.

6. The apparatus as set forth in claim 5, wherein one of said inner and outer frame elements includes a shoulder for engaging the terminating edge of the vehicle window aperture to position the outer frame relative thereto.

7. The apparatus as set forth in claim 5, wherein said hinge means comprises:

a base attached relative to the vehicle body and displaced from said first frame;

a pivotable member;

the first end of said pivotal member pivotably connected relative to said base at a first pivot point;

the second end of said pivotal member pivotably connected relative to said second frame at a second pivot point.

8. The method of converting a fixed window in the rear panel of a motor vehicle to a pivotably openable closure, comprising the steps of:

removing the existing window pane, leaving a remainder body opening;

discarding all framing and gasket material used in mounting and weatherproofing the original pane;

providing a first substitute frame for trim of the remainder body opening and as a mounting base for a new closure;

clamping and weathersealing said first substitute frame around the periphery of the remainder opening;

providing a second substitute frame for the salvaged existing window pane;

mounting said salvaged existing pane in the second substitute frame and weathersealing the union therebetween; and providing means for holding the remounted pane in any one of a selected plurality of relative positions with respect to said retrimmed remainder opening.

* * * * *